(12) United States Patent
Yoda et al.

(10) Patent No.: US 11,890,796 B2
(45) Date of Patent: Feb. 6, 2024

(54) MOLD CLAMPING APPARATUS PROVIDED WITH FORCEFUL MOLD OPENING MECHANISM

(71) Applicant: NISSEI PLASTIC INDUSTRIAL CO., LTD., Nagano-ken (JP)

(72) Inventors: Hozumi Yoda, Nagano-ken (JP); Atsushi Murata, Nagano-ken (JP); Satoshi Hoshino, Nagano-ken (JP)

(73) Assignee: NISSEI PLASTIC INDUSTRIAL CO., LTD.

( * ) Notice: Subject to any disclaimer, the term of this patent is extended or adjusted under 35 U.S.C. 154(b) by 0 days.

(21) Appl. No.: 16/924,111

(22) Filed: Jul. 8, 2020

(65) Prior Publication Data

US 2021/0078228 A1 Mar. 18, 2021

(30) Foreign Application Priority Data

Sep. 12, 2019 (JP) .................. 2019-165833

(51) Int. Cl.
*B29C 45/68* (2006.01)
*B29C 33/24* (2006.01)
*B29C 45/76* (2006.01)

(52) U.S. Cl.
CPC ............. *B29C 45/68* (2013.01); *B29C 33/24* (2013.01); *B29C 45/7653* (2013.01); *B29C 2045/686* (2013.01); *B29C 2045/688* (2013.01)

(58) Field of Classification Search
CPC ............. B29C 45/68; B29C 2045/686; B29C 2045/688; B29C 33/24; B29C 45/7653
See application file for complete search history.

(56) References Cited

U.S. PATENT DOCUMENTS 5,863,474 A 1/1999 Ito et al. ............... 264/40.5
6,468,449 B1 * 10/2002 Fujikawa ............ B29C 45/6714
425/150

(Continued)

FOREIGN PATENT DOCUMENTS

| JP | 4883642 | 12/2011 |
| JP | 4883642 B2 * | 2/2012 |
| WO | 01047686 | 7/2001 |

OTHER PUBLICATIONS

Machine translation of JP4883642B2 (Year: 2012).*

(Continued)

*Primary Examiner* — Jacob T Minskey
*Assistant Examiner* — Wayne K. Swier
(74) *Attorney, Agent, or Firm* — ADAMS & WILKS

(57) ABSTRACT

In a mold clamping apparatus, a mold clamping mechanism is provided with a half nut, and a tie bar is provided with circumferential groove configured to meshed with the teeth of the half nut. A strong-force mold opening mechanism that opens molds at an initial stage of mold opening extends across a space separating a movable platen and the mold clamping mechanism and is connected to the movable platen and the mold clamping mechanism. The strong-force mold opening mechanism is set so as to have greater axial force and shorter stroke than those of a mold opening and closing mechanism. A control unit controls opening and closing of the half nut, controls the strong-force mold opening mechanism and controls the position of the half nut in such a way that the half nut is synchronized with the circumferential groove by the strong-force mold opening mechanism.

15 Claims, 12 Drawing Sheets

(56) References Cited

U.S. PATENT DOCUMENTS

| | | | | |
|---|---|---|---|---|
| 2007/0085238 A1* | 4/2007 | Manabe | ............. | B29C 45/6728 |
| | | | | 264/299 |
| 2010/0227014 A1* | 9/2010 | Kato | ..................... | B22D 17/26 |
| | | | | 425/451.9 |
| 2015/0273750 A1* | 10/2015 | Ikarashi | ............. | B29C 45/6728 |
| | | | | 264/40.5 |
| 2015/0336296 A1* | 11/2015 | Aida | ................. | B22D 17/2007 |
| | | | | 425/150 |
| 2016/0121530 A1* | 5/2016 | Yoda | ................. | B29C 45/1761 |
| | | | | 425/589 |
| 2017/0057143 A1* | 3/2017 | Murata | .............. | B29C 45/1751 |
| 2018/0001378 A1* | 1/2018 | Murata | ................. | B22D 17/26 |

OTHER PUBLICATIONS

Merriam-Webster On-line dictionary https://www.merriam-webster.com/dictionary/plate (Year: 2013).*
Extended European Search Report dated Feb. 9, 2021 in Application No. EP 20 19 1779.
English-language machine translation of Japanese Patent No. 4883642, Registration Date Dec. 16, 2011.
English-language machine translation of Notice of Reasons for Refusal dated Oct. 5, 2021 in Japanese Patent Application 2019-165833.
English-language machine translation of Publication No. JP 05-060826, Publication Date Aug. 10, 1993.
English-language machine translation of Publication No. JP 2004-314492, Publication Date Nov. 11, 2004.

* cited by examiner

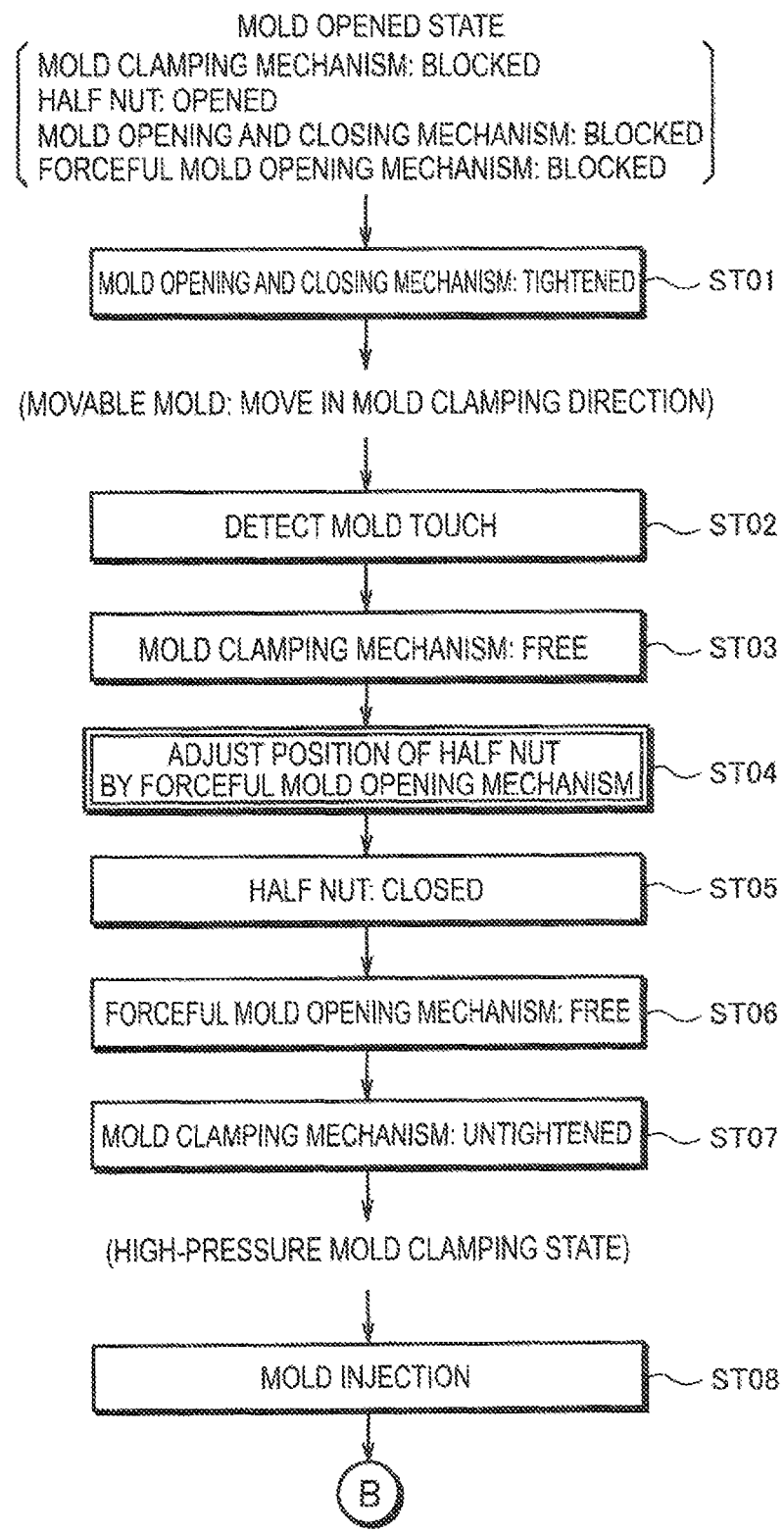

HALF NUT: CLOSED

HIGH-PRESSURE MOLD CLAMPING

FORCEFUL MOLD OPENING

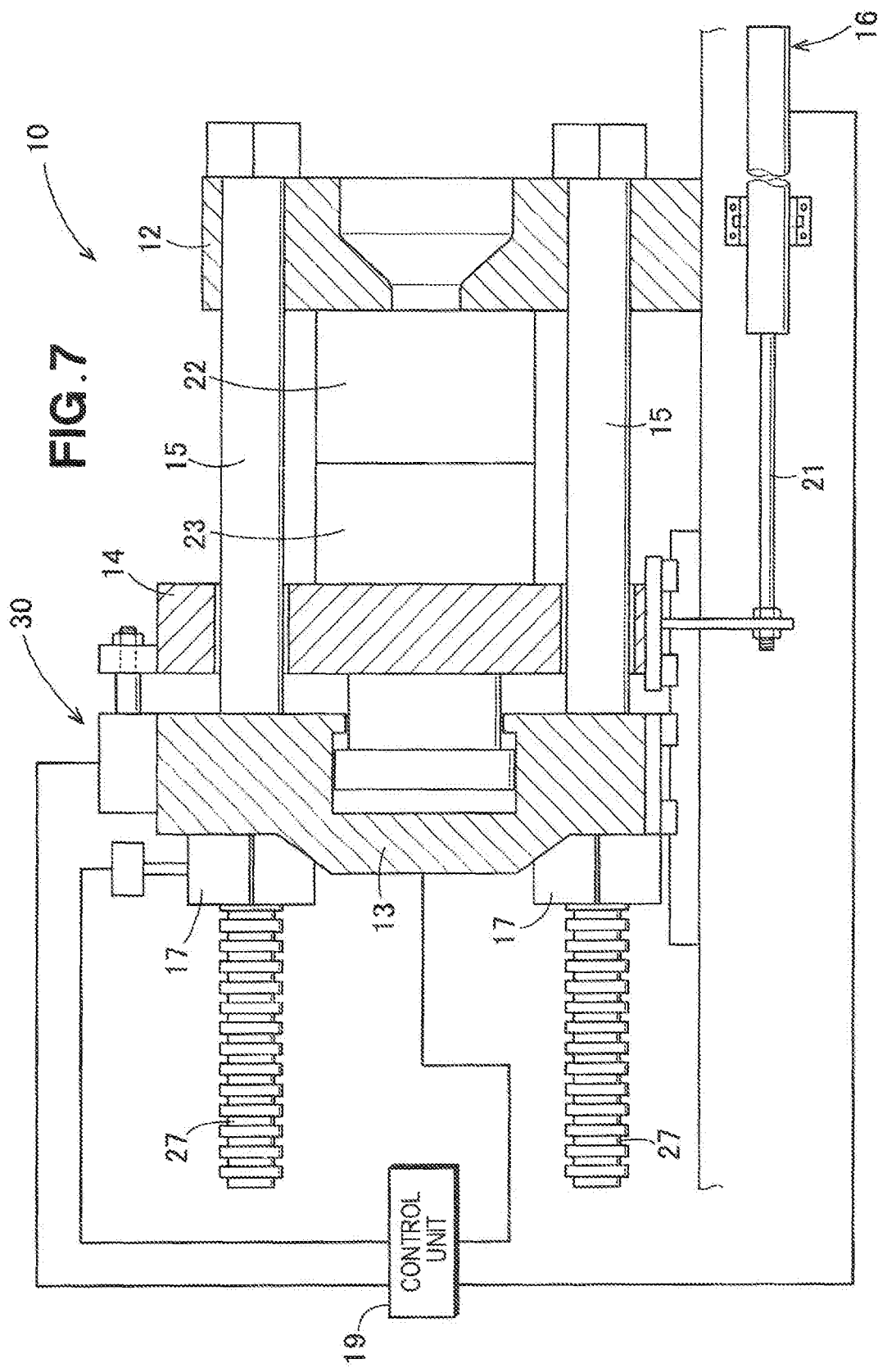

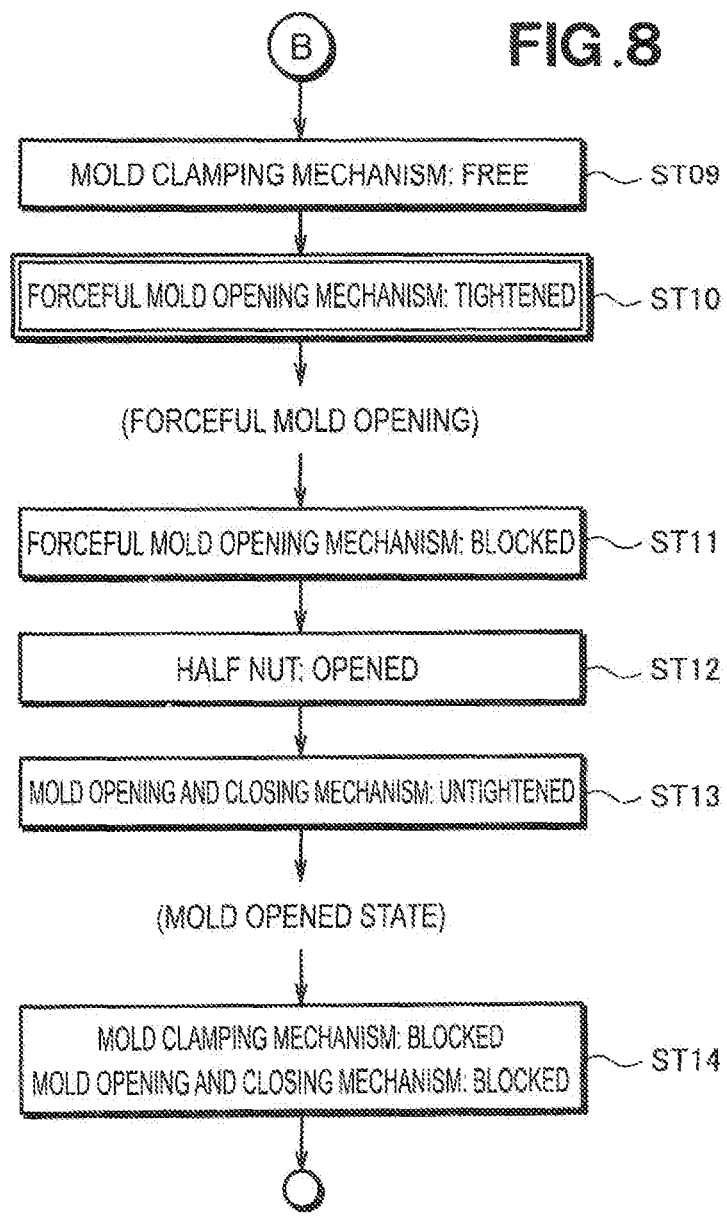

MOLD CLAMPING APPARATUS PROVIDED WITH FORCEFUL MOLD OPENING MECHANISM

FIELD OF THE DISCLOSURE

The present disclosure relates to a mold clamping apparatus provided with a forceful mold opening mechanism.

BACKGROUND OF THE DISCLOSURE

An injection molding apparatus mainly includes an injection apparatus and a mold clamping apparatus. The mold clamping apparatus clamps metal molds.

A melted resin material is injected from the injection apparatus into the clamped metal molds. When the resin material is hardened, the metal molds are opened and a resin product is taken out.

The metal molds instantaneously need large mold opening force at an opened moment (the initial stage of mold opening). After the metal molds are opened slightly, the metal molds can be easily opened by small force.

A mechanism that opens metal molds by large force at the initial stage of mold opening is called a forceful mold opening mechanism.

For example, Japan Patent No. 4883642 discloses a mold clamping apparatus provided with such a forceful mold opening mechanism.

With reference to FIG. 11, the forceful mold opening mechanism disclosed in Japan Patent No. 4883642 will be described.

FIG. 11 is a diagram for describing the basic structure of a conventional mold clamping apparatus. This figure illustrates a mold opened state.

A mold clamping apparatus 100 mainly includes a stationary platen 102 to which a stationary mold 101 is attached, tie bars 103, a movable platen 105 to which a movable mold 104 is attached, and a mold clamping cylinder 106 that moves the movable platen 105.

Servo motors 107 are fastened to the stationary platen 102, and nuts 108 are fastened to the movable platen 105. A ball screw 109 extended from each servo motor 107 is engaged with each nut 108. When the ball screws 109 are turned in a mold clamping direction by the respective servo motors 107, the movable platen 105 moves toward the stationary platen 102. This movement is continued until the movable mold 104 contacts the stationary mold 101.

Since a mold clamping ram 111 is coupled to the movable platen 105 by a coupling box 110, the mold clamping ram 111 moves together with the movable platen 105.

Conversely, since the position of the mold clamping cylinder 106 is set by the tie bars 103 extended from the stationary platen 102, the mold clamping cylinder 106 does not move. A half nut 113 is formed on each mold clamping piston 112 of the mold clamping cylinder 106.

FIG. 12 is a diagram for describing an action of a conventional mold clamping apparatus. In this figure, the movable mold 104 is contacting the stationary mold 101 (including "substantially contacting"). The half nut 113 is engaged with a circumferential groove 114 formed in the mold clamping ram 111. Next, hydraulic pressure is applied to a mold clamp room 115 of the mold clamping cylinder 106. Since the mold clamping piston 112, the mold clamping ram 111, the coupling box 110, the movable platen 105, and the movable mold 104 are depressed together in the molding clamping direction, mold clamping is achieved.

Mold injection is performed in the mold clamped state. After the melted resin material is hardened, the mold opening is performed.

In the initial stage of mold opening, hydraulic pressure is supplied to the mold opening room 115. This causes the mold clamping piston 112, the mold clamping ram 111, the coupling box 110, the movable platen 105, and the movable mold 104 to move together in the mold opening direction. This movement is subjected to forceful mold opening.

After this forceful mold opening, the half nut 113 is separated from the mold clamping ram 111. Next, the ball screws 109 are turned in the mold opening direction by the respective servo motors 107. In this case, the movable mold 104, the movable platen 105, the coupling box 110, and the mold clamping ram 111 move together in the mold opening direction, and the state returns to the state in FIG. 11.

Meanwhile, since the mold clamping cylinder 106 is provided with not only the mold opening room 115 but also the mold clamp room 116, the structure is complicated. Hence, the mold clamping cylinder 106 is expensive and thus the mold clamping apparatus 100 is also expensive.

In recent years, cost reduction for production facilities is requested, and thus a mold clamping apparatus (a mold clamping apparatus provided with a forceful mold opening mechanism) that can simplify structure of the mold clamping cylinder 106 is demanded.

SUMMARY OF THE DISCLOSURE

An objective of the present disclosure is to provide a technology capable of simplifying, in a mold clamping apparatus provided with a forceful mold opening mechanism, the structure of a mold clamping mechanism.

According to a first embodiment of the present disclosure, there is provided a mold clamping apparatus provided with a forceful mold opening mechanism. This apparatus includes:

a base;

a stationary platen fastened to the base;

a mold clamping mechanism which is placed in parallel with the stationary platen, and which is supported by the base so as to be freely movable;

a movable platen placed between the mold clamping mechanism and the stationary platen;

a tie bar which is extended from the stationary platen, and which passes completely through the movable platen and through the mold clamping mechanism;

a mold opening and closing mechanism that moves the movable platen along the tie bar; and a control unit that controls the mold opening and closing mechanism, and the mold clamping mechanism, in which:

the mold clamping mechanism is provided with a half nut, and the tie bar is provided with a circumferential groove to be meshed with the half nut;

a forceful mold opening mechanism that opens the molds at an initial stage of mold opening is provided across the movable platen and the mold clamping mechanism;

the forceful mold opening mechanism is set so as to have greater axial force than the mold opening and closing mechanism, and to have a shorter stroke than the mold opening and closing mechanism, and the control unit controls opening and closing of the half nut, controls the forceful mold opening mechanism, and also controls a position of the half nut in such a way that the half nut is synchronized with the circumferential groove by the forceful mold opening mechanism.

According to the present disclosure, since the forceful mold opening mechanism is separately provided from the mold clamping mechanism, the structure of the mold clamping mechanism can be simplified, resulting in a cost reduction.

Moreover, the mold clamping mechanism according to the present disclosure is a movable body. The mold clamping mechanism that is a movable body moves substantially together with the movable platen. The forceful mold opening mechanism is provided across the movable platen and the mold clamping mechanism which move substantially together with each other. The forceful mold opening mechanism can have a short stroke, thus accomplishing downsizing.

Moreover, since the forceful mold opening mechanism also serves as the half nut position adjusting mechanism that finely adjusts the position of the half nut, the additional value is remarkable. That is, an independent half nut position adjusting mechanism becomes unnecessary.

As described above, according to the present disclosure, the mold clamping apparatus that can accomplish the simplification of the structure and the cost reduction is provided.

It is preferable that the tooth of the above-described half nut should be a rectangular tooth, and the above-described circumferential groove should be a rectangular groove matching the above-described rectangular tooth.

The rectangular tooth includes: a circumferential surface parallel to the lengthwise axis of the half nut; a first tooth surface which is continuous from one edge of the circumferential surface, and which is orthogonal to the lengthwise axis; and a second tooth surface which is continuous from the other edge of the circumferential surface and which is orthogonal to the lengthwise axis.

The circumferential groove includes: a groove bottom parallel to the lengthwise axis of the tie bar; a first side face which is continuous from one edge of the groove bottom, and which is orthogonal to the lengthwise axis; and a second side face which is continuous from the other end of the groove bottom, and which is orthogonal to the lengthwise axis.

At the time of mold clamping, the first tooth surface intimately contacts the first side face. At the time of forceful mold opening, the second tooth surface intimately contacts the second side face. Since the first tooth surface and the second tooth surface are both orthogonal to the lengthwise axis, a mechanical coupling force between the half nut and the tie bar can be sufficiently enhanced.

BRIEF DESCRIPTION OF THE DRAWINGS

Several preferable embodiments of the present disclosure will be described below in detail with reference to the accompanying drawings in which:

FIG. 5 is a control flowchart from a mold opened state to mold injection;

FIG. 7 is a diagram illustrating the mold clamping apparatus in mold clamping;

FIG. 8 is a control flowchart subsequent to the mold injection;

DETAILED DESCRIPTION OF THE PREFERRED EMBODIMENTS

Embodiments of the present disclosure will be described below with reference to the accompanying figures.

Figure 1:
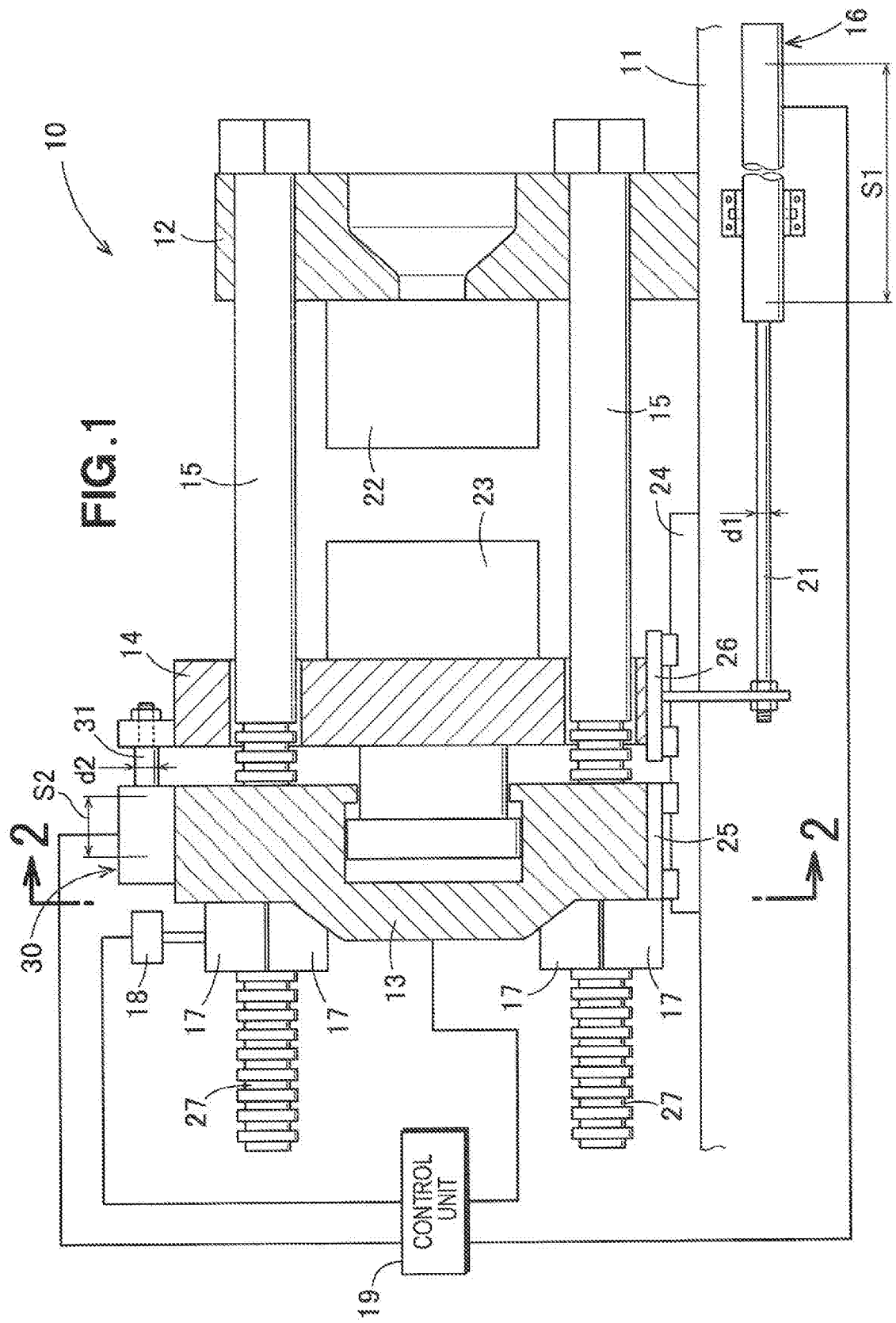
FIG. 1 is a front view of a mold clamping apparatus provided with a forceful mold opening mechanism according to the present disclosure.

As illustrated in FIG. 1, a mold clamping apparatus 10 provided with a forceful mold opening mechanism (simply referred to as the mold clamping apparatus 10 below) includes a base 11, a stationary platen 12 fastened to the base 11, an mold clamping mechanism 13 supported by the base 11 so as to be freely movable, a movable platen 14 which is placed between the mold clamping mechanism 13 and the stationary platen 12, and which is supported by the base 11 so as to be freely movable, tie bars 15 which are extended from the stationary platen 12 and which pass completely through the movable platen 14 and through the mold clamping mechanism 13, a mold opening and closing mechanism 16 that moves the movable platen 14 along the tie bars 15, a forceful mold opening mechanism 30 provided across the movable platen 14 and the mold clamping mechanism 13, half nuts 17 attached to the mold clamping mechanism 13, a half nut opening and closing mechanism 18 that opens and closes the half nuts 17, and a control unit 19 that controls the half nut opening and closing mechanism 18, the forceful mold opening mechanism 30, the mold opening and closing mechanism 16, and the mold clamping mechanism 13.

The forceful mold opening mechanism 30, also sometimes referred to as a strong-force mold opening mechanism, is set so as to have or exert a greater axial force than that of the mold opening and closing mechanism 16, and have a shorter stroke than that. As an example of this setting, the mold opening and closing mechanism 16 has a small diameter d1 of an actuation rod 21 (a piston in the case of a hydraulic cylinder), and has a long stroke S1, while the forceful (strong-force) mold opening mechanism 30 has a large diameter d2 of an actuation rod 31 (a piston in the case of a hydraulic cylinder), and has a short stroke S2.

A stationary mold 22 is attached to the stationary platen 12, and a movable mold 23 is attached to the movable platen 14.

Preferably, a rail 24 is laid on the base 11, and sliders 25 and 26 are mounted on the rail 24. Moreover, the mold clamping mechanism 13 is supported by the one slider 25, and the movable platen 14 is supported by the other slider 26.

It is recommended to put steel balls between the rail 24 and the sliders 25 and 26. A frictional loss between the rail 24 and the sliders 25 and 26 can be reduced, and thus a load on the mold opening and closing mechanism 16 can be reduced.

Since the movable platen 14 is mechanically coupled to the mold clamping mechanism 13, when the movable platen 14 is moved by the mold opening and closing mechanism 16, the mold clamping mechanism 13 is also moved together (including substantially together).

Note that the actuation rod 21 of the mold opening and closing mechanism 16 may be coupled to the movable platen 14, or may be coupled to the mold clamping mechanism 13. Moreover, the mold opening and closing mechanism 16 may be attached to the base 11, or may be attached to the stationary platen 12.

A circumferential groove 27 is formed in a necessary portion of each tie bar 15 at an equal pitch. When closed, the respective half nuts 17 are engaged with the respective circumferential grooves 27. When engagement is accomplished, the mold clamping mechanism 13 is fastened to the tie bars 15 (including substantially fastened thereto).

When the half nuts 17 are opened, the mold clamping mechanism 13 becomes movable relative to the tie bars 15.

Figure 2:
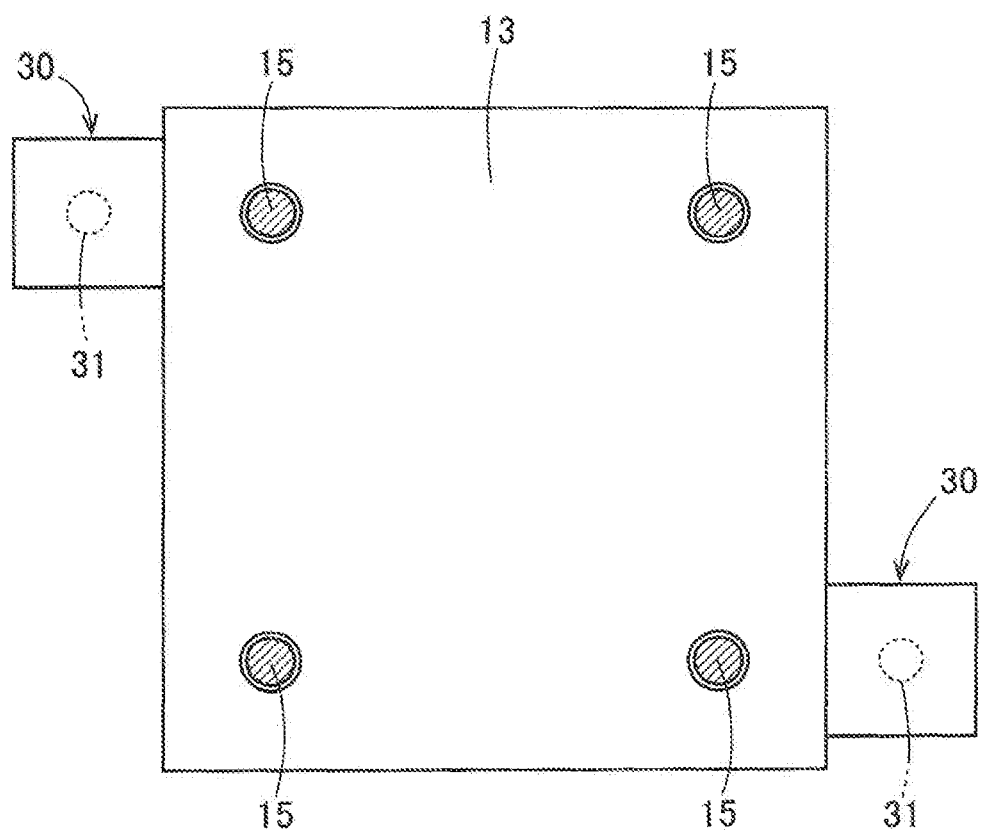
FIG. 2 is a diagram cut along an arrow 2-2 in FIG. 1.

As illustrated in FIG. 2, for example, the forceful mold opening mechanisms 30 are provided at the upper left corner of the mold clamping mechanism 13 and the lower right corner thereof. By providing the two forceful mold opening mechanisms 30 at so-called diagonal locations, in FIG. 1, the mold clamping mechanism 13 can be moved without an inclination relative to the movable platen 14. Alternatively, the movable platen 14 can be moved without an inclination relative to the mold clamping mechanism 13.

The number of forceful mold opening mechanisms 30 may be one or four, and is optional as appropriate. However, the four such mechanisms result in an increase in costs, and one such a mechanism may have a possibility such that the movable platen 14 (or the mold clamping mechanism 13) may be inclined. Hence, the two such mechanisms are preferable.

It is also desirable that the two mold opening and closing mechanisms (see FIG. 1, reference numeral 16) should be placed at the diagonal locations. However, there is no practical problem even if the number of the mold opening and closing mechanisms 16 is one.

Figure 3:
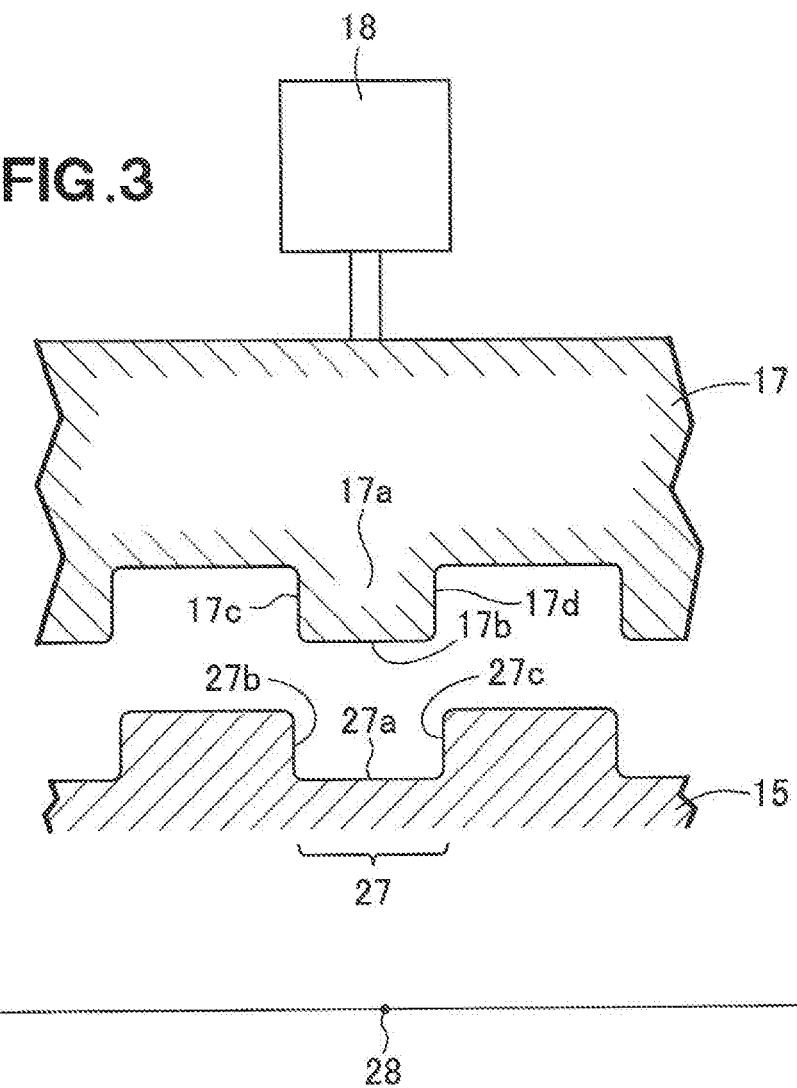
FIG. 3 is an enlarged cross-sectional view of a tooth of a half nut, and a circumferential groove of a tie bar.

As illustrated in FIG. 3, the tooth of each half nut 17 is a rectangular tooth 17a. The rectangular tooth 17a includes a circumferential surface 17b parallel to a lengthwise axis 28 of the half nut 17, a first tooth surface 17c which is continuous from one edge of the circumferential surface 17b, and which is orthogonal to the lengthwise axis 28, and a second tooth surface 17d which is continuous from the other edge of the circumferential surface 17b, and which is orthogonal to the lengthwise axis 28.

Moreover, the circumferential groove 27 of each tie bar 15 includes a groove bottom 27a parallel to the lengthwise axis 28 of the tie bar 15, a first side face 27b which is continuous from one edge of the groove bottom 27a, and which is orthogonal to the lengthwise axis 28, and a second side face 27c which is continuous from the other edge of the groove bottom 27a, and which is orthogonal to the lengthwise axis 28.

The rectangular tooth 17a is a tooth that has a rectangular cross section.

If the tooth of the half nut 17 has a triangular cross section or a trapezoidal cross section, the tooth surface inclines relative to the lengthwise axis 28. Such an inclination converts some axial force into force in the radial direction, and the half nut 17 is opened by the force in the radial direction.

In this point, in the case of the tooth that has a rectangular cross section according to the present disclosure, the half nut 17 is not opened.

The mold clamping mechanism 13, the mold opening and closing mechanism 16, the forceful mold opening mechanism 30, and the half nut opening and closing mechanism 18 illustrated in FIG. 1 may each be any of a hydraulic cylinder, a pneumatic cylinder, an electrically driven cylinder, and an electrically driven mechanism.

Figure 4:
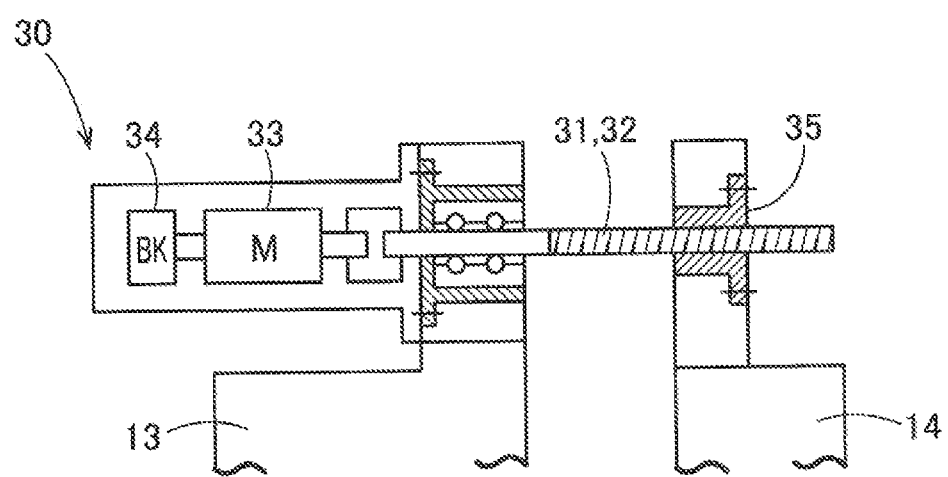
FIG. 4 is a structural diagram of the forceful mold opening mechanism.
Figure 9:
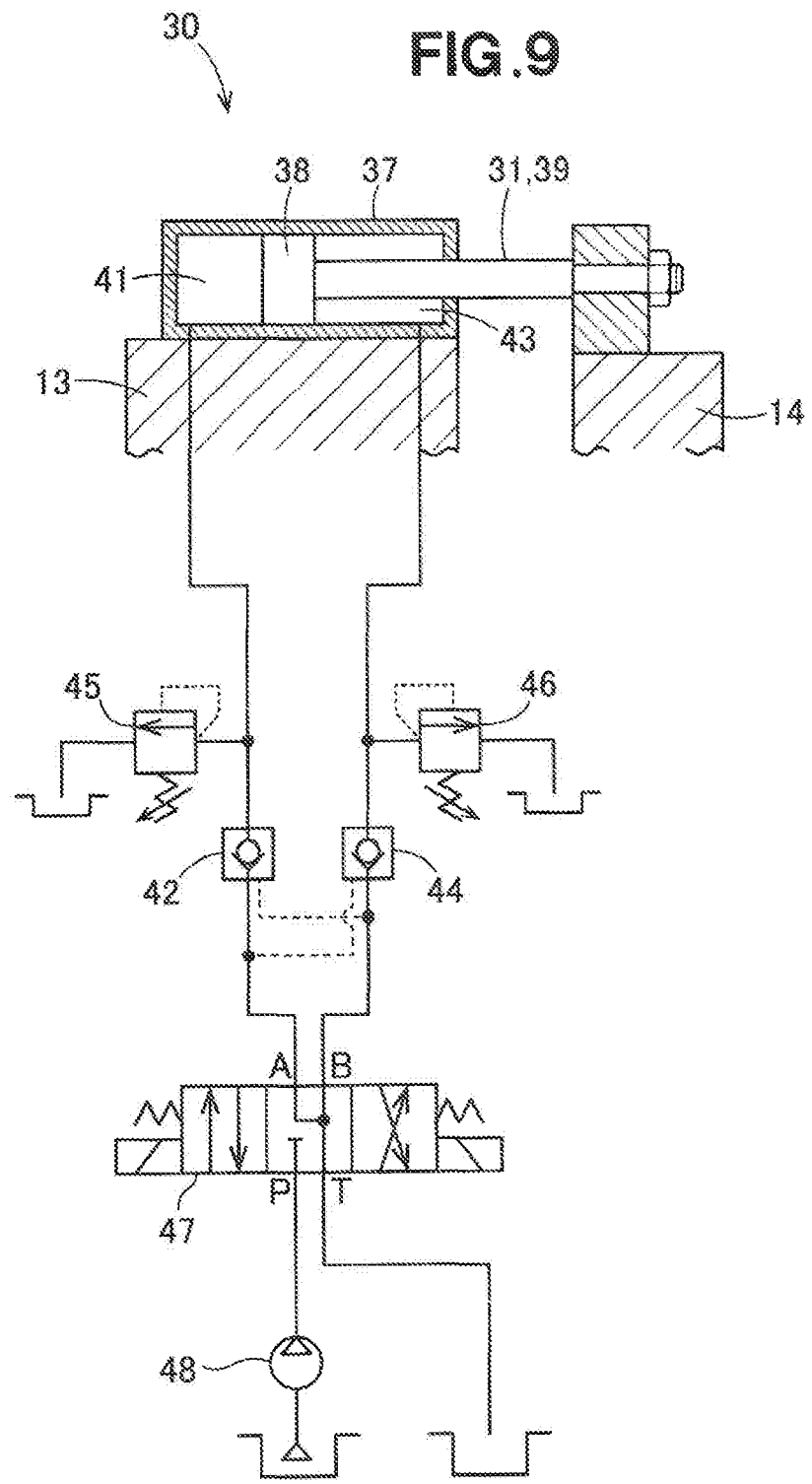
FIG. 9 is another structural diagram of the forceful mold opening mechanism.

FIG. 4 illustrates a specific example case in which the forceful mold opening mechanism 30 is an electrically driven mechanism, and FIG. 9 illustrates a specific example case in which it is a hydraulic cylinder.

Since a pneumatic cylinder has the same structure and operation as those of the hydraulic cylinder, the detailed description thereof will be omitted.

Moreover, since an electrically driven mechanism has the similar structure and operation to those of the electrically driven mechanism, the detailed description thereof will be omitted.

As illustrated in FIG. 4, the forceful mold opening mechanism 30 includes, for example, a ball screw 32 that is also the actuation rod 31 attached to the mold clamping mechanism 13 so as to be freely rotatable, an electric motor 33 that rotates the ball screw 32, an electric brake 34 attached to the electric motor 33, and a nut 35 attached to the movable platen 14. The electric motor 33 and the brake 34 are controlled by the control unit (see FIG. 1, reference numeral 19).

Note that the nut 35 may be provided on the mold clamping mechanism 13, and the ball screw 32, the electric motor 33, and the brake 34 may be provided on the movable platen 14.

The operation of the forceful mold opening mechanism 30 includes four patterns that are "untighten operation", "tighten operation", "block", and "free".

Note that the term "untighten operation" means to move the movable platen 14 apart from the mold clamping mechanism 13. The term "tighten operation" means to move the movable platen 14 close toward the mold clamping mechanism 13. The term "block" means that the movable platen 14 is standstill relative to the mold clamping mechanism 13. The term "free" means that the movable platen 14 moves freely relative to the mold clamping mechanism 13.

The four patterns will be described below in detail.

Pattern 1: With the brake not being actuated, when the electric motor is rotated in the positive direction (rotated in the clockwise direction), the movable platen 14 moves apart relative to the mold clamping mechanism 13 illustrated in FIG. 4. That is, the forceful mold opening mechanisms 30 are subjected to the "untighten operation.

Pattern 2: With the brake not being actuated, when the electric motor is rotated in the negative direction (rotated in the counterclockwise direction), the movable platen 14 moves close to the mold clamping mechanism 13 illustrated in FIG. 4. That is, the forceful mold opening mechanism 30 is subjected to the "tighten operation.

Pattern 3: With a power supply to the electric motor being terminated so as to be in an unactuated state, when the brake is actuated, the ball screw becomes unable to rotate. In this case, the movable platen 14 is fastened relative to the mold clamping mechanism 13 illustrated in FIG. 4. That is, the forceful mold opening mechanisms 30 become a "blocked" state.

Pattern 4: With the electric motor being unactuated, when the brake is unactuated, the ball screw becomes able to freely rotate. In FIG. 4, when it is attempted to move the movable platen 14 to the right side or to the left side in the figure, the ball screw 32 rotates, permitting the movement of the movable platen 14. That is, the forceful mold opening mechanism 30 becomes a "free" state.

The operations of the mold clamping apparatus 10 that employs the above structure will be described with reference to FIG. 5.

In the mold opened state illustrated in FIG. 1, the mold clamping mechanism 13 is in the blocked state, the half nuts 17 are in the opened state, the mold opening and closing mechanism 16 is in the blocked state, and the forceful mold opening mechanisms 30 are in the blocked state.

In step ST01 (step number 01, the same is true of the following notations) illustrated in FIG. 5, the mold opening and closing mechanism is subjected to the tighten operation. This causes the movable mold to start moving in the mold clamping direction.

When the movable mold touches the stationary mold (step ST02), the mold clamping mechanism is made in the free state (step ST03).

The amount of movement of the mold clamping mechanism 13 can be calculated by the mold opening and closing mechanism 16 illustrated in FIG. 1. The position of the circumferential groove 27 formed in each tie bar 15 is also known. Hence, the position of the tooth of each half nut 17 can also be found physically.

In view of the above information, the positional displacement amount between the circumferential groove 27 and the tooth of the half nut 17 can be calculated.

By the forceful mold opening mechanisms 30, the mold clamping mechanism 13 is slightly moved so as to correct the positional displacement (see FIG. 5, step ST4). That is, each half nut is synchronized with each circumferential groove.

A synchronizat ion procedure by the forceful (strongforce) mold openingmechanisms 30 will be described in more detail.

The movable platen 14 is in a standstill state by the mold opening and closing mechanism 16. Hence, when the forceful mold opening mechanisms 30 are subjected to the untighten operation, the mold clamping mechanisms 13 moves in the direction becoming apart from the movable platen 14. Moreover, when the forceful mold opening mechanisms 30 are subjected to the tighten operation, the mold clamping mechanisms 13 moves so as to come close to the movable platen 14. Through the above operations, the tooth of each half nut 17 is synchronized with each circumferential groove 27.

Figure 6A:
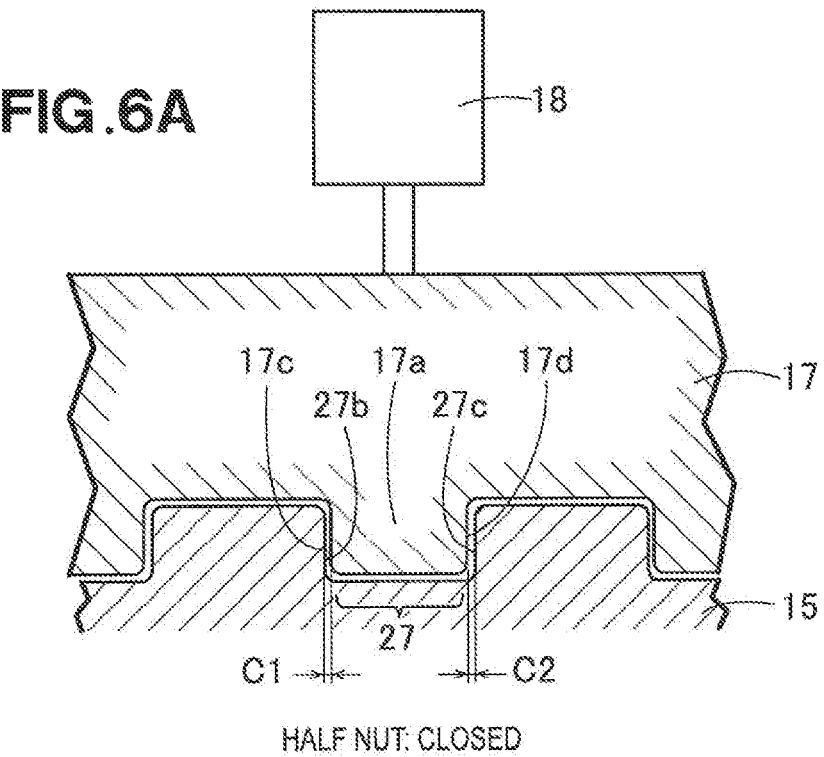
FIG. 6A is a diagram for describing the half nut in a closed state.

After the synchronization, each half nut is closed (step ST05). That is, as illustrated in FIG. 6A, the rectangular tooth 17a is meshed with the circumferential groove 27. Since the position of each half nut has been adjusted in the step ST04, a clearance C1 is present between the first side face 27b and the first tooth surface 17c, and a clearance C2 is present between the second side face 27c and the second tooth surface 17d. The clearance C1 and the clearance C2 are consistent (including substantially consistent) with each other. The presence of the clearances C1 and C2 enables the closing work of the half nut 17 to be carried out smoothly.

Since one of the roles of the forceful mold opening mechanisms 30 completes, the forceful mold opening mechanisms 30 are made in the free state (step ST06).

Next, the mold clamping mechanism is subjected to the tighten operation (step ST07). This causes the movable mold to be intensively depressed against the stationary mold, and thus a high-pressure mold clamping state is achieved.

Figure 6B:
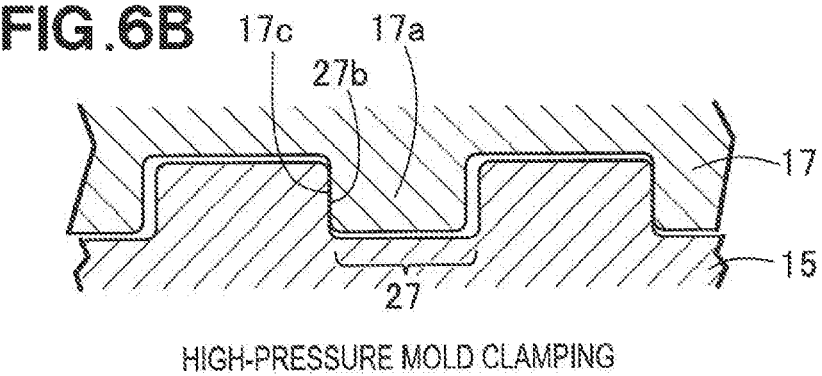
FIG. 6B is a diagram for describing the half nut in high-pressure mold clamping.

Meanwhile, when the mold clamping mechanism 13 is subjected to tighten operation, the half nut 17 attempts to become apart from the stationary platen 12 by counteraction. This causes, as illustrated in FIG. 6B, the first tooth surface 17c to contact the first side face 27b. In the subsequent operation, the half nut 17 cannot move in the direction becoming apart from the stationary platen 12.

Mold injection is performed in this state (see FIG. 5, step ST08).

As illustrated in FIG. 7, the high-pressure mold clamping on the movable mold 23 against the stationary mold 22, and mold injection have been performed.

After the resin material is hardened, as a preparation for forceful mold opening, the mold clamping mechanism 13 is made in the free state (see FIG. 8, step ST09).

Next, in the initial stage of the mold opening, the forceful mold opening mechanisms are subjected to the tighten operation (step ST10). In FIG. 7, the mold clamping mechanism 13 is standstill (including substantially standstill). The movable platen 14 is pulled by intensive force relative to the standstill mold clamping mechanism 13. This causes the movable mold 23 to be opened from the stationary mold 22. That is, the forceful mold opening is performed.

Subsequently, the forceful mold opening mechanisms are made in the blocked state (step ST11), each half nut is made in the opened state (step ST12), and the mold opening and closing mechanism is subjected to the untighten operation to perform the remaining mold opening (step ST13).

In the mold opened state, the mold clamping mechanism is made in the blocked state, and the mold opening and closing mechanism is made in the blocked state (step ST14). This causes the state to return to FIG. 5, and also FIG. 1.

Figure 6C:
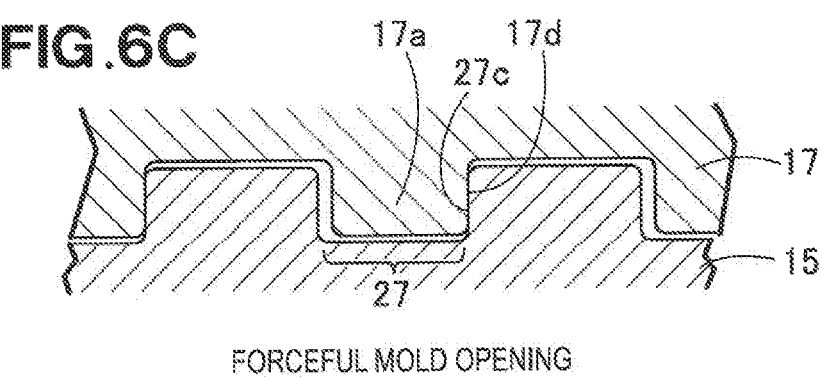
FIG. 6C is a diagram for describing the half nut in forceful mold opening.

Note that when the forceful mold opening mechanisms are subjected to the tighten operation in the step ST10, in FIG. 7, each half nut 17 attempts to come close to the stationary platen 12 by counteraction. This causes, as illustrated in FIG. 6C, the second tooth surface 17d contacts the second side face 27c. Since the second side face 27c and the second tooth surface 17d are orthogonal to the lengthwise axis (see FIG. 3, reference numeral 28), force is transmitted only along the lengthwise axis. The same is true of the case in FIG. 6B.

That is, in both cases of FIG. 6B and of FIG. 6C, no force in the radial direction (the upper direction in FIG. 6B and in FIG. 6C) is applied to each half nut 17. Since no force in the radial direction is applied, each half nut 17 does not open.

Next, a specific example in which the forceful mold opening mechanisms 30 are each a hydraulic cylinder will be described with reference to FIG. 9.

As illustrated in FIG. 9, each forceful mold opening mechanism 30 may be a hydraulic cylinder that includes a cylinder 37 fastened to the mold clamping mechanism 13, a piston 38 held in the cylinder 37, and a piston rod 39 that is the actuation rod 31 extended from the piston 38. The piston rod 39 is mechanically coupled to the movable platen 14. Note that the cylinder 37 may be provided on the movable platen 14, and the piston rod 39 may be coupled to the mold clamping mechanism 13.

The operation of the forceful mold opening mechanism 30 that mainly includes a hydraulic cylinder also includes four patterns that are "untighten operation", "tighten operation", "blocked", and "free."

First, the pattern "blocked" will be described.

In this pattern, a directional control valve 47 has a port A and a port B connected to a port T, has first and second check valves 42 and 44 closed, and has first and second relief valves 45 and 46 closed.

As for a hydraulic oil in a first oil chamber 41, a discharge thereof is prevented by the first check valve 42, and, as for a hydraulic oil in a second oil chamber 43, a discharge thereof is prevented by the second check valve 44. The piston 38 does not move at this time. When the hydraulic pressure in the first oil chamber 41 is equal to or lower than a certain value and the hydraulic pressure in the second oil chamber 43 is equal to or lower than the certain value, the piston 38 does not move.

That is, the forceful mold opening mechanism 30 is in the "blocked" state.

Next, the pattern "free" will be described.

In this pattern, the directional control valve 47 has the port A and the port B connected to the port T, has the first and second check valves 42 and 44 closed, and has the first and second relief valves 465 and 46 opened and closed in accordance with the value of the hydraulic pressure.

When external force is applied to the piston rod 39, and for example, the hydraulic pressure in the first oil chamber 41 exceeds the certain value, the first relief valve 45 opens, and the piston 38 moves. When the hydraulic pressure in the second oil chamber 43 exceeds the certain value, the second relief valve 46 opens and the piston 38 moves.

That is, the forceful mold opening mechanism 30 becomes a quasi-"free" state.

Next, the pattern "untighten operation" will be described.

In this pattern, the directional control valve 47 has a port P connected to the port A, has the port B connected to the port T, has the first and second check valves 42 and 44 opened, and has the first and second relief valve 45 and 46 closed.

That is, when the directional control valve 47 is changed over and the port P becomes in communication with the port A, the hydraulic oil to be supplied by a hydraulic pressure pump 48 is supplied to the first oil chamber 41 through the first check valve 42. Simultaneously, the second check valve 44 is opened by pilot pressure. The port B becomes in communication with the port T, and the hydraulic oil in the second oil chamber 43 is discharged through the second check valve 44. The forceful mold opening mechanism 30 is then untightened.

Next, the pattern "tighten operation" will be described.

In this pattern, the directional control valve 47 has the port P connected to the port B, has the port A connected to the port T, has the first and second check valves 42 and 44 opened, and has the first and second relief valves 45 and 46 closed.

That is, the directional control valve 47 is changed over, and when the port P becomes in communication with the port B and the port A becomes in communication with the port T, the forceful mold opening mechanism 30 is tightened.

The flows illustrated in FIG. 5 and FIG. 8 can be also carried out by such a hydraulic cylinder.

Figure 10:
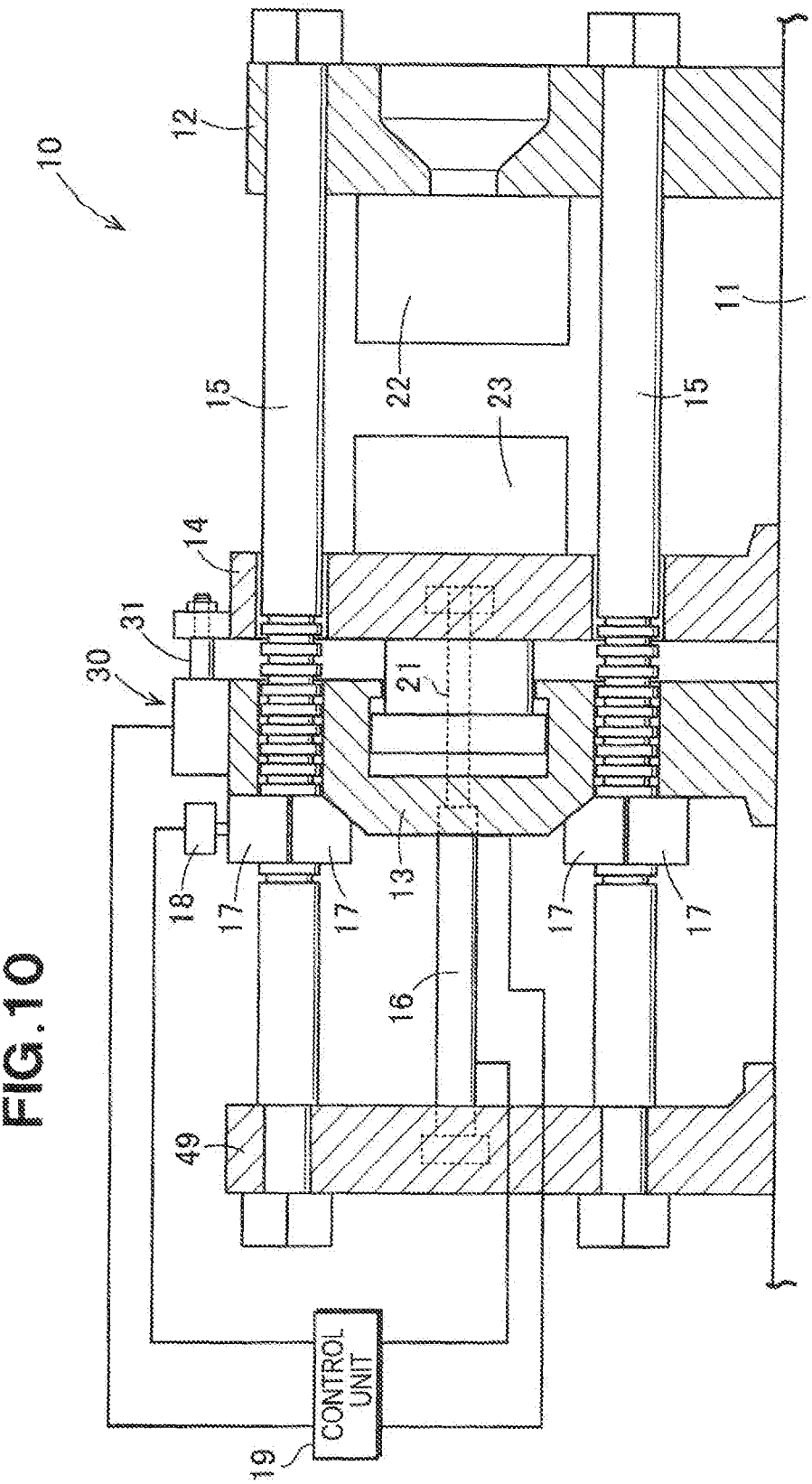
FIG. 10 is another front view of the mold clamping apparatus provided with the forceful mold opening mechanism according to the present disclosure.
Figure 11:
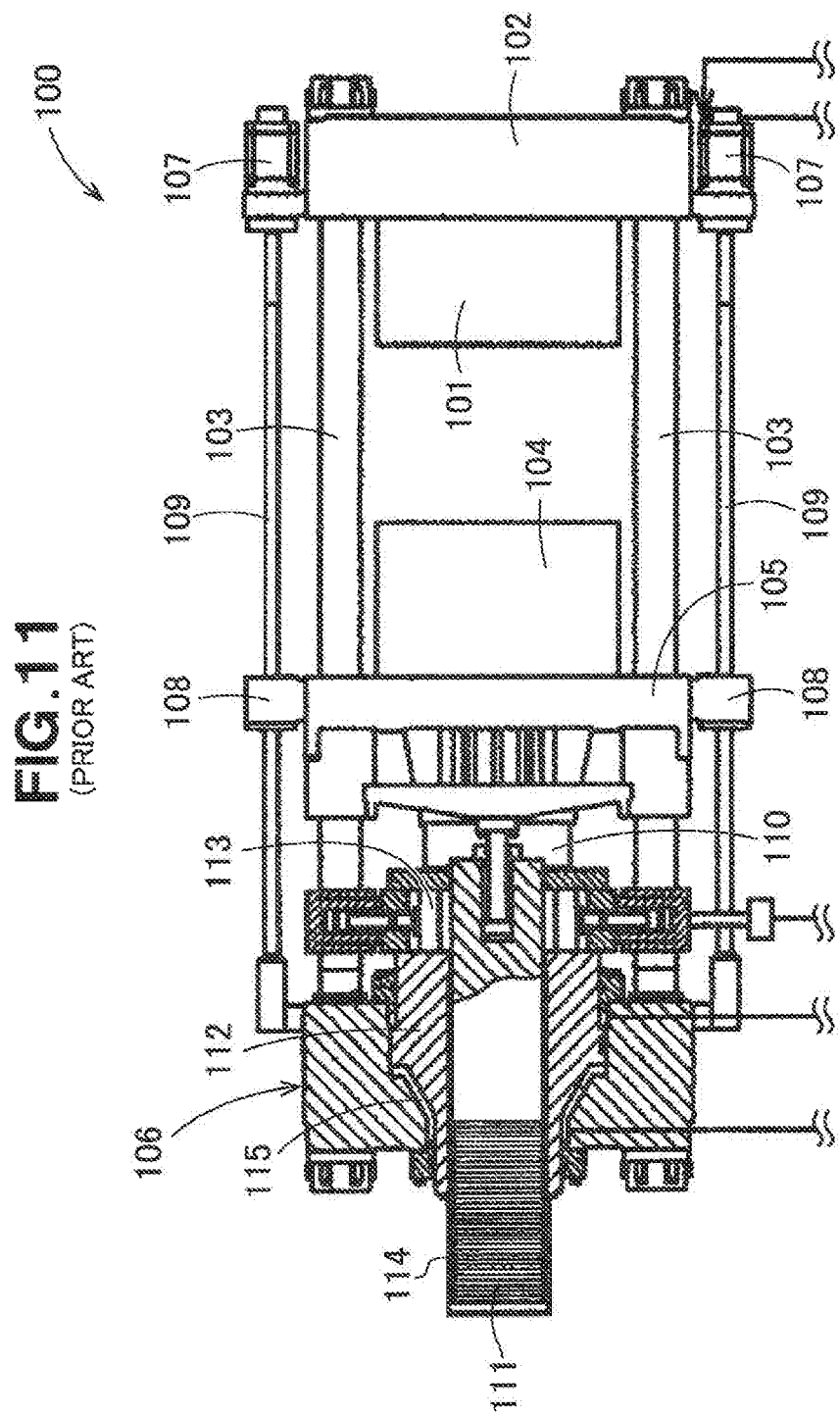
FIG. 11 is a diagram for describing a basic structure of a conventional mold clamping apparatus.
Figure 12:
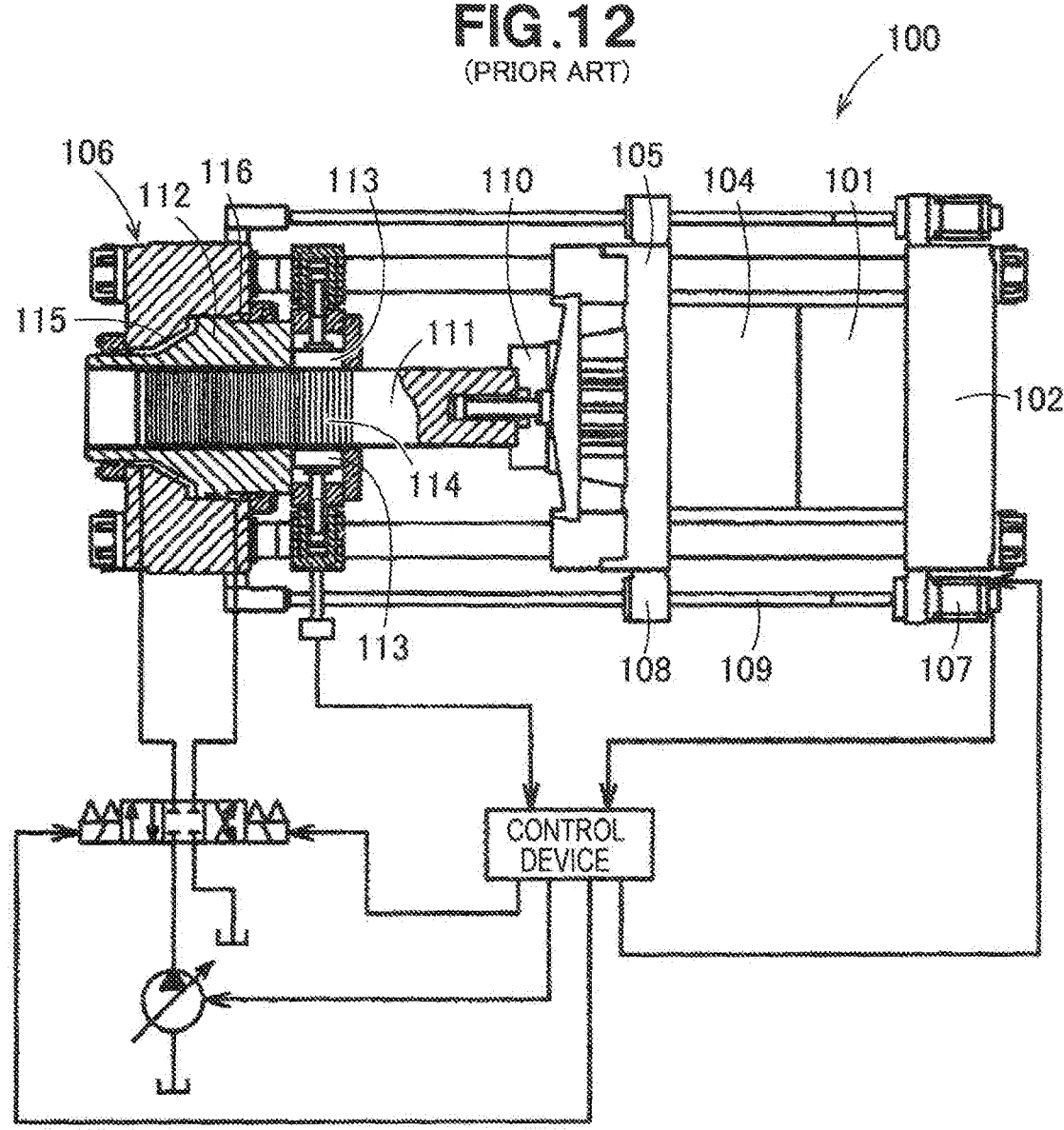
FIG. 12 is a diagram for describing an operation of the conventional mold clamping apparatus.

Next, a modified example will be described with reference to FIG. 10. Note that the same component as that of FIG. 1 will be denoted by the same reference numeral in FIG. 1, and the detailed description thereof will be omitted.

That is, the free end of the tie bar 15 is supported by a shaft support plate 49. The mold opening and closing mechanism 16 is provided across the shaft support plate 49 and the movable platen 14 (or the mold clamping mechanism 13). Both of (or either one of) the movable platen 14 and the mold clamping mechanism 13 are directly mounted on the base 11 directly. Other structures are the same as those in FIG. 1.

Note that, in FIG. 6, although it is preferable that the tooth of the half nut 17 should be the rectangular tooth 17a that has a rectangular cross section, since forceful opening force can be set so as to be smaller than clamping force, the second tooth surface 17d and the second side face 27c may be inclined surfaces. That is, the tooth of the half nut 17a may be asymmetrical such that the left half in the figure is a rectangular cross section, and the right half in the figure is a trapezoidal or triangular cross section.

The present disclosure is suitable for a mold clamping apparatus provided with a forceful mold opening mechanism.

What is claimed is:

1. A mold clamping apparatus provided with a strong-force mold opening mechanism, the apparatus comprising:
    a base:
    a stationary platen supporting a stationary mold and fastened to the base;
    a mold clamping mechanism disposed parallel to the stationary platen and supported by the base so as to be freely movable in an axial direction along a guideway, the mold clamping mechanism having an outer peripheral side surface extending around a periphery thereof;
    a movable platen supporting a moveable mold and disposed between the mold clamping mechanism and the stationary platen and freely movable along the guideway relative to the mold clamping mechanism, the movable platen having an outer peripheral side surface extending around a periphery thereof and being spaced apart from the mold clamping mechanism in the axial direction;
    one or more tie bars extending from the stationary platen completely through the movable platen and through the mold clamping mechanism;
    wherein the one or more tie bars each have a series of circumferential grooves, and the mold clamping mechanism has one or more half nuts movable into and out of meshing engagement with the series of circumferential groove on respective tie bars to close and open the half nuts;
    a mold opening and closing mechanism connected to move the movable platen along the one or more tie bars and the guideway;
    at least one strong-force mold opening mechanism that opens the molds only at an initial stage of mold opening, that extends across the space between the movable platen and the mold clamping mechanism, and that moves the mold clamping mechanism in the axial direction relative to the one or more tie bars to synchronize the position of each half nut with the circumferential grooves on respective tie bars, each strong-force mold opening mechanism being configured to exert a greater axial force than that exerted by the mold opening and closing mechanism, each strong-force mold opening mechanism comprising an electric motor for rotationally driving a ball screw, and a brake for braking the electric motor, attached to the outer peripheral side surface of one of the mold clamping mechanism or the movable platen, and a nut threadedly engaged with the ball screw and attached to the outer peripheral side surface of the other of the mold clamping mechanism or the movable platen; and
    a control unit configured to control the mold opening and closing mechanism, control the mold clamping mechanism, control opening and closing movement of each half nut, control each strong-force mold opening mechanism, and control a position of each half nut so that the half nut is synchronized with the circumferential grooves on its respective tie bar by the strong-force mold opening mechanism.

2. The mold clamping apparatus provided with the forceful mold opening mechanism according to claim 1,
wherein each half nut has series of circumferential teeth, each tooth having a rectangular cross-sectional shape, and each series of circumferential grooves has a rectangular cross-sectional shape matching the rectangular shape of the teeth.

3. The mold clamping apparatus provided with a strong-force mold opening mechanism according to claim 1,
wherein the one or more tie bars and the one or more half nuts comprise four tie bars and four half nuts.

4. The mold clamping apparatus provided with a strong-force mold opening mechanism according to claim 1,
wherein the one or more tie bars and the one or more half nuts comprise one tie bar and one half nut.

5. The mold clamping apparatus provided with a strong-force mold opening mechanism according to claim 1,
wherein the at least one strong-force mold opening mechanism comprises plural strong-force mold opening mechanisms controlled by the control unit.

6. The mold clamping apparatus provided with a strong-force mold opening mechanism according to claim 1,
wherein the at least one strong-force opening mechanism comprises two strong-force mold opening mechanisms.

7. The clamping apparatus provided with a strong-force mold opening mechanism according to claim 6,
wherein the two strong-force mold opening mechanisms are positioned diagonally opposite one another relative to the mold clamping mechanism.

8. A mold clamping apparatus provided with a strong-force mold opening mechanism, the apparatus comprising:
a base;
a stationary platen supporting a stationary mold and fastened to the base;
a mold clamping mechanism disposed parallel to the stationary platen and supported by the base so as to be freely movable in an axial direction along a guideway, the mold clamping mechanism having an outer peripheral side surface extending around a periphery thereof;
a movable platen supporting a movable mold and disposed between the mold clamping mechanism and the stationary platen and freely movable along the guideway relative to the mold clamping mechanism, the movable platen having an outer peripheral side surface extending around a periphery thereof and being space apart from the mold clamping mechanism in the axial direction;
one or more tie bars extending from the stationary platen completely through the movable platen and through the mold clamping mechanism;
wherein the one or more tie bars each have a series of circumferential grooves, and the mold clamping mechanism has one or more half nuts movable into and out of meshing engagement with the series of circumferential grooves on respective tie bars to close and open the half nuts;
a mold opening and closing mechanism connected to move the movable platen along the one or more tie bars and the guideway;
at least one strong-force mold opening mechanism that opens the molds only at an initial stage of mold opening, that extends across the space between the movable platen and the mold clamping mechanism, and that moves the mold clamping mechanism in the axial direction relative to the one or more tie bars to synchronize the position of each half nut with the circumferential grooves on respective tie bars, each strong-force mold opening mechanism being configured to exert a greater axial force than the exerted by the mold opening mechanism comprising a first hydraulic cylinder having a cylinder attached to the outer peripheral side surface of one of the mold clamping mechanism or the movable platen, and a piston slidable in the cylinder and having a piston rod attached to the outer peripheral side surface of the other of the mold clamping mechanism or the movable platen; and
a control unit configured to control the mold opening and closing mechanism, control the mold clamping mechanism, control opening and closing movement of each half nut, control each strong-force mold opening mechanism, and control a position of each half nut so that the half is synchronized with the circumferential grooves on its respective tie bar by the strong-force mold opening mechanism.

9. The mold clamping apparatus provided with a strong-force mold opening mechanism according to claim 8,
wherein each half nut has a series of circumferential teeth, each tooth having a rectangular cross-sectional shape, and each series of circumferential grooves has a rectangular cross-sectional shape matching the rectangular shape of the teeth.

10. The mold clamping apparatus provided with a strong-force mold opening mechanism according to claim 8,
wherein the one or more tie bars and the one or more half nuts comprise four tie bars and four half nuts.

11. The mold clamping apparatus provided with a strong-force mold opening mechanism according to claim 8,
wherein the one or more tie bars and the one or more half nuts comprise one tie bar and one half nut.

12. The mold clamping apparatus provided with a strong-force mold opening mechanism according to claim 8,
wherein the at least one strong-force mold opening mechanism comprises plural strong-force mold opening mechanisms controlled by the control unit.

13. The mold clamping apparatus provided with a strong-force mold opening mechanism according to claim 8,
wherein the at least one strong-force opening mechanism comprises two strong-force mold opening mechanisms.

14. The mold clamping apparatus provided with a strong-force mold opening mechanism according to claim 13,
wherein the two strong-force mold opening mechanisms are positioned diagonally opposite one another relative to the mold clamping mechanism.

15. The mold clamping apparatus provided with a strong-force mold opening mechanism according to claim 8,
wherein the mold opening and closing mechanism comprises a second hydraulic cylinder having a cylinder connected to the base and a piston rod connected to the movable platen, and
wherein the piston rod of the second hydraulic cylinder has a diameter smaller than the piston rod of the fir hydraulic cylinder.

* * * * *

UNITED STATES PATENT AND TRADEMARK OFFICE
CERTIFICATE OF CORRECTION

PATENT NO. : 11,890,796 B2
APPLICATION NO. : 16/924111
DATED : February 6, 2024
INVENTOR(S) : Hozumi Yoda, Atsushi Murata and Satoshi Hoshino It is certified that error appears in the above-identified patent and that said Letters Patent is hereby corrected as shown below:

In the Claims

In Claim 8, Column 12, Line 8, "the exerted by the" should be changed to --that exerted by the mold opening and closing mechanism, and each strong-force--

Signed and Sealed this
Ninth Day of April, 2024

Katherine Kelly Vidal
*Director of the United States Patent and Trademark Office*